Feb. 12, 1963     G. W. SCHAUER, JR     3,077,529
DOMESTIC APPLIANCE

Filed April 28, 1960     2 Sheets-Sheet 1

INVENTOR.
George W. Schauer, Jr.
BY
His Attorney

Feb. 12, 1963 G. W. SCHAUER, JR 3,077,529
DOMESTIC APPLIANCE
Filed April 28, 1960 2 Sheets-Sheet 2
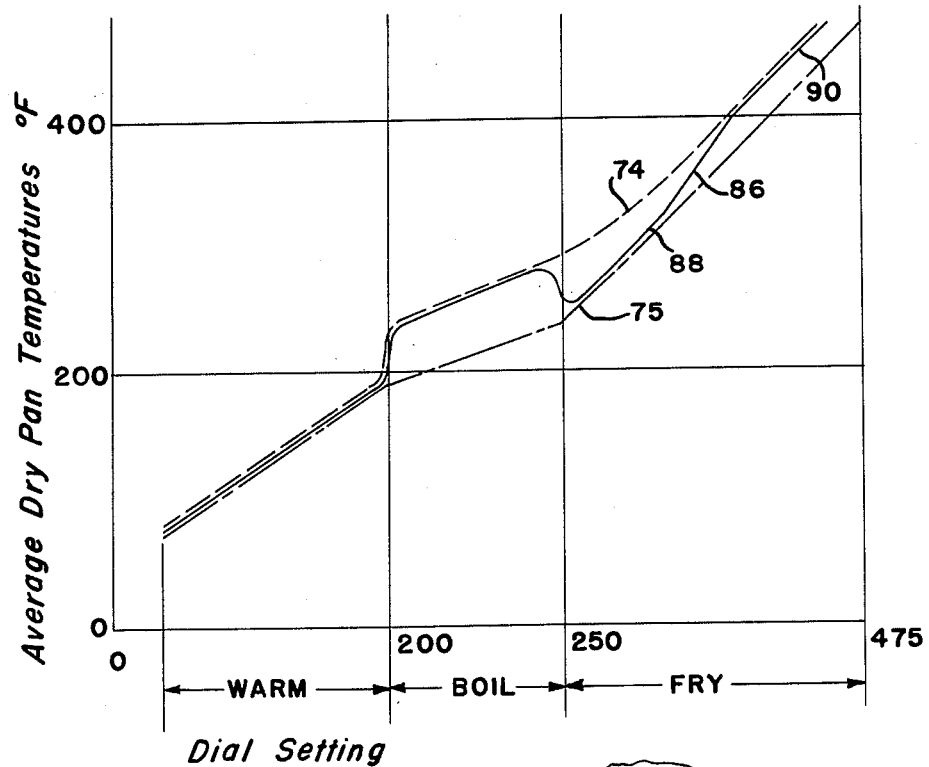
Fig. 5
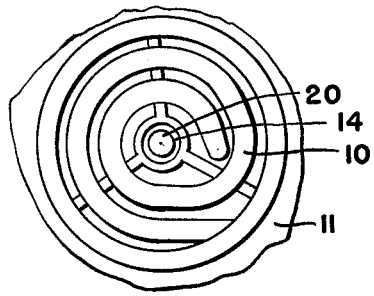
Fig. 2
| | Contact Number | | | |
|---|---|---|---|---|
| | 29 | 25 | 41 | 22 |
| Off | | | | X |
| Warm and fry range | X | C | X | C |
| Boil range | X | C | | C |
Fig. 3
X = closed
C = cycling
INVENTOR.
George W. Schauer, Jr.
BY
Frederick M. Ritchie
His Attorney

United States Patent Office 3,077,529
Patented Feb. 12, 1963

3,077,529
DOMESTIC APPLIANCE
George W. Schauer, Jr., Dayton, Ohio, assignor to General Motors Corporation, Detroit, Mich., a corporation of Delaware
Filed Apr. 28, 1960, Ser. No. 25,474
10 Claims. (Cl. 219—20)

This invention relates to a domestic appliance and more particularly to an improved temperature sensing control system for a surface cooking unit on electric range.

In the cooking art, the range or spread of cooking temperatures for surface units is generally defined as the Warm range, the Boil range and the Fry range in order of increasing cooking temperatures. In the ideal operation of surface cooking units it is desirable to effect controlled variations or overshoot in cooking unit temperatures from the selected norm, i.e. a minimum overshoot in the Warm range where delicate foods are being prepared, a maximum overshoot in the Boil range where large quantities of liquid are being brought to a boil, and a variable overshoot in the Fry range to accommodate a variety of cooking procedures. More particularly, the Fry range needs a minimum overshoot condition within its lower temperature spread and an increasing overshoot as the fry range temperatures increase. Prior art temperature sensing systems have provided a constant overshoot throughout the Warm, Boil and Fry ranges and consequently fail to meet the conditions of overshoot best suited for all cooking procedures. It is to the provision of a variable overshoot condition for a temperature sensing system that this invention is directed.

Accordingly, it is an object of this invention to provide a temperature sensing control system for a surface cooking unit with means for effecting a variable temperature overshoot condition.

It is a further object of this invention to provide a temperature control system for a surface cooking unit having a minimum temperature overshoot in the Warm range, a maximum temperature overshoot in the Boil range, and a variable temperature overshoot in the Fry range.

More particularly, it is an object of this invention to provide an auxiliary heater for a bimetal actuated switch which is selectively energized to decrease the temperature overshoot on the first cycle in the Warm and Fry range while still allowing a large first cycle overshoot temperature in the Boil range.

A further object of this invention is the provision of a non-linear rheostat selectively positioned by a control actuator for a temperature responsive system for surface cooking units to effect variable overshoot conditions in accordance with the temperature selected.

Specifically, it is an object of this invention to provide an anticipator heater for a bimetal cycler switch in a temperature responsive system, said anticipator heater being selectively energized in accordance with the temperature selection on the temperature sensing system.

Further objects and advantages of the present invention will be apparent from the following description, reference being had to the accompanying drawings wherein preferred embodiments of the present invention are clearly shown.

In the drawings:

FIGURE 2 is a fragmentary elevational view of a surface cooking unit;

FIGURE 3 is a contact cycle chart for the switches shown in FIGURE 1;

FIGURE 5 is a graphic representation of the operation of the embodiments of this invention.

Figures 1, 4:
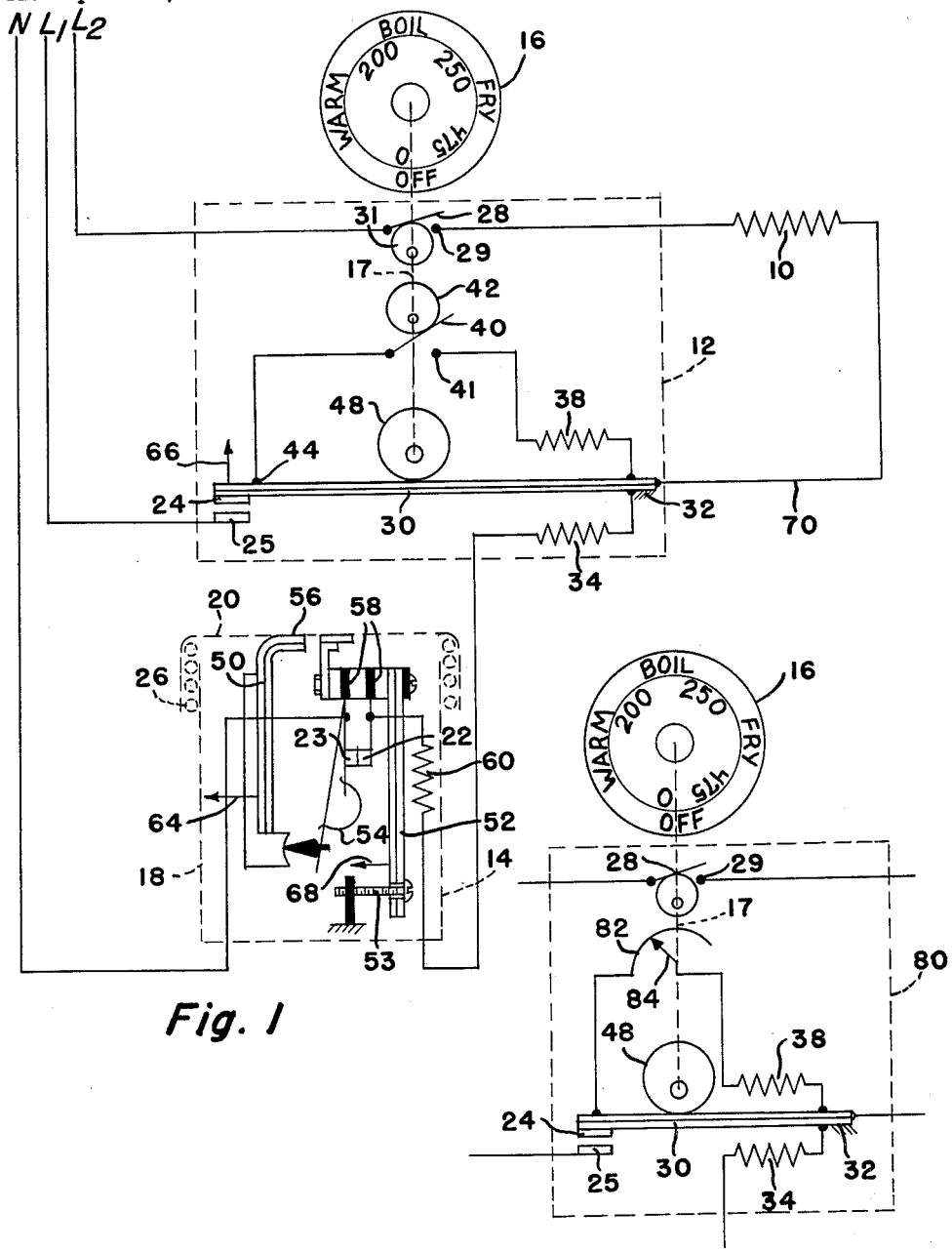
FIGURE 1 is a schematic wiring diagram of this invention.
FIGURE 4 is another embodiment of this invention.

In accordance with this invention and with reference to FIGURES 1 and 2, a temperature responsive control system is set forth schematically for a surface cooking unit 10 having an output rating of approximately 2600 watts. The surface cooking unit or heating element 10 may be of a spiral tubular sheath design which is commonly found on an electric stove or range. Such surface units are disposed on the top of electric ranges and the utensils may be supported thereon for preparing foods. In order to secure the proper operating temperatures for the surface cooking unit, it is desirable to energize and deenergize the surface unit to maintain the proper pan temperature for the food which is being prepared. Consequently, a temperature responsive control system may be of the bimetal actuated type having two basic parts, a switch assembly 12 and a sensing unit 14.

The switch assembly 12 is mounted in the control panel area of an electric range and includes a control knob 16 which may be manipulated by the operator in accordance with the desired temperatures for a cooking operation. This permits selection of temperatures remote from the sensing unit 14.

The sensing unit 14 is a control device mounted in the center of the spirally wound surface unit 10. The cylindrical container 18 has a spring mounted cap 20 which is self-aligning with the bottom of any cooking utensil placed on the surface unit 10. As its name implies, this unit senses actual utensil temperature and acts as a thermostat by opening and closing a set of bimetal actuated cycling contacts 22, 23. The temperature sensing circuit of which the cycling contacts 22, 23 are a part operates on 118 volts whereas the cycling contacts 24, 25 of the switch 12 cycle the full 2600 watts of the surface unit at 236 volts.

It should be understood that all utensils should be flat-bottomed for best results. The sensing unit should be free from burned material on the cap 20 and the cap should move freely on its mounting which includes a spring 26. The upper surface of the surface unit 10 should also be level and the sheath thereof neither warped nor distorted.

The switch assembly contains a main line on-off switch blade 28 operating on a contact 29 and a cycler or pulser consisting of a bimetal 30 fixed as at 32, a set of cycling contacts 24, 25 and an auxiliary heater or actuator 34 which receives its signals and is energized through the sensing unit 14. The cycling contact pair 24, 25 is closed by the cam 48 and the main line switch contact 29 is closed by the cam 31 at the time the switch knob 16 is turned on to rotate the control shaft 17. Of course, any suitable linkage responsive to the rotation of the control knob 16 could be used to selectively condition the contacts in the control switch 12.

In addition to the auxiliary heater 34, the bimetal 30 is provided with an overshoot control circuit including an auxiliary heater or actuator 38 which is in parallel with the auxiliary heater 34 and in series with a switch 40, 41 operated by the manipulation of the control knob 16. The overshoot control circuit is connected as at 44 to the bimetal 30, thereby establishing a circuit through the heater 38 whenever the switch contact 41 and the cycler switch contact 25 are closed. Since the switch pair 24, 25 is a cycling switch, it may be seen that the overshoot control auxiliary heater 38 is energized intermittently whenever the circuit energization switch blade 40 is closed on the contact 41. With reference to the contact cycle chart on FIGURE 3, it is seen that the contact 41 is closed by the contact switch blade 40 in the Warm and Fry range of the control knob 16. Thus, the overshoot is minimized in these two temperature ranges. Rotation of the switch knob 16 from the off position will close the line switch contact 29. Further, rotation of the knob 16 and shaft 17 operates to adjust mechanically the switch 12 for the desired temperature selection through a cam 48 which variably biases or positions the bimetal 30 in relationship to the fixed cycler contact 25.

The sensing unit contains two bimetals 50 and 52 which operate a single pair of contacts 22, 23 through a toggle mechanism 54. Bimetal 50 is welded solidly as at 56 to the cap 20 of the sensing unit, and therefore is controlled predominantly by the utensil or pan temperature. A second bimetal 52 is isolated from the cap by means of insulators 58 and is surrounded by a heater 60 connected electrically in series with the switch auxiliary heater 34 and the sensing unit contacts 22, 23.

The switch auxiliary heater 34, of 600 ohms resistance, is energized intermittently with the cycling of the sensing unit contacts 22, 23. The current is approximately .105 ampere at normal line voltage of 118 volts. Actual voltage drop across the heater 34 is approximately 63 volts. The sensing unit heater 60 has a resistance of about 525 ohms and the current is approximately .105 ampere at normal line voltage of 118 volts. Actual voltage drop across the heater 60 is 55 volts. Of course, the values for current and resistance set forth hereinabove may vary in accordance with the cooking unit controlled. Note also that the resistance rating for the heater 38 will depend on the amount of heat required to secure the desired overshoot. This, in turn, takes into consideration the proximity of the heater to the bimetal.

When a utensil is placed on the surface unit and thus in juxtaposition to the sensing cap 20 and the switch knob 16 is turned on to a particular temperature setting, the switch contacts 29 and 25 are closed. Surface unit 10 draws full wattage at 236 volts. As the temperature of the utensil increases, the sensing unit bimetal 50 feels this increase. Bimetal 50 then moves in the direction indicated by the arrow 64 which, in turn, tends to maintain the sensing unit contacts 22, 23 in a closed position.

Completion of the circuit through contacts 22, 23 energizes the heaters 34 and 60. In turn, heater 34 causes the bimetal 30 within the switch 12 to move in the direction of arrow 66, thereby permitting the contacts 24, 25 in the switch to open, virtually stopping the flow of current to the surface unit 10. Likewise, heat from the heater 60 moves the sensing bimetal 52 in the direction indicated by the arrow 68, thus permitting contacts 22, 23 to open by means of the toggle action or overcenter action afforded by the over-center spring 54. In effect, the continuous cycling action occurs to give a balancing or compensating effect at the sensing unit thus providing a close control of utensil temperature. Bimetal 52 also compensates for increased temperatures in the area around the surface unit 10 and may be adjusted by a calibration screw 53.

As may be seen by noting the schematic diagram of FIGURE 1, it is possible for either the sensing unit cycling switch 22, 23 or the switch cycler 24, 25 to function independently of each other. In other words, the switch cycler 24, 25 is energized from $L_1$, fixed contact 25, cycling contact 24, the bimetal 30, line 70, the surface unit 10, main line switch 28, 29 to $L_2$. On the other hand, the sensing unit cycling switch 22 is on a 118 volt circuit from the neutral (N), the cycling contacts 22, 23, the sensing unit auxiliary heater 60, the cycling switch auxiliary heater 34, line 70, the surface unit 10, main line switch 28, 29 to $L_2$.

When a heated utensil and load are replaced by a cold load, fast recovery of the surface unit temperature is possible since the sensing unit contacts 22, 23, open when the cap 20 is chilled. The switch contacts 24, 25 close shortly thereafter because the heater 34 is no longer energized when sensing contacts 22 are open. Note that contacts 24, 25 are normally closed when the heater 34 is not energized. Thus, 2600 watts of energy are supplied intermittently and for appropriately longer intervals to the surface unit until the temperature adjustment is satisfied.

Without the additional circuit which includes the overshoot control auxiliary heater 38, and its conditioning switch 40, 41, a generally unchanging temperature overshoot condition occurs on the first cycle of each setting on the control knob 16 i.e. the Warm range, the Boil range and the Fry range. These various ranges of cooking temperatures are seen graphically in FIGURE 5, wherein the average dry pan temperature for a given user's temperature selection is shown as a curve 75.

It has been determined that a minimum overshoot condition should occur in the Warm range which includes temperatures between approximately 100° to 200° F. It is in the Warm range that milk such as in a baby's bottle is heated. It is therefore imperative that overshoot temperatures, i.e. variation from the selected temperature settings, be kept to an absolute minimum in order not to scald or boil the milk. In the Boil range, however, large quantities of liquids are sought to be raised in temperature quickly. Although the liquid, for instance water, will boil at between 200° and 212° F., the mass of the pan and the large bulk of the water necessitate a maximum temperature overshoot to bring the substance up to temperature quickly in the Boil range. Variable overshoot conditions are found best in the Fry range. In the low temperatures of the Fry range, 250° to 350° F. approximately, operations such as baking pancakes are accomplished and a minimum overshoot is desired on the first cycle so that the cakes will not be burned. However, in the higher temperature ranges approaching 475° F., a larger overshoot is again desirable for this is the area in which deep fat frying is done. As in heating water in the Boil range, it is desired quickly to bring the bulk of heating oil or grease to a sufficiently high temperature for French frying. Also at the higher temperatures of the Fry range, searing steaks is effected best with a high overshoot on the first cycle. Consequently, the most desirable control system in the fry range would embody a minimum overshoot at the low fry range temperatures which would increase gradually to a maximum overshoot condition in the high fry range temperatures.

The foregoing results of the subject temperature sensing system, which includes the auxiliary anticipating heater 38, is graphically illustrated in the curve 74 of FIGURE 5. Curve 74 best illustrates the actual temperature at the surface of the cooking unit 10 when controlled by the circuitry of FIGURE 1. Reference may also be had to the contact chart of FIGURE 3 which illustrates the open and closed condition of the contacts 29, 25, 41 and 22. The legend for use with FIG. 3 is as follows: X when the contacts are closed and C when the contacts are cycling or intermittently opening and closing. Thus, in operation and with the control knob 16 set for the Warm range, i.e. temperatures from approximately 100° to 200° F., the main line switch contact 29 will be closed, the overshoot control circuit contact 41 will be closed and the cycler contacts 25 and 22 will be pulsing or cycling in accordance with the temperatures sensed by the cap 20 of the sensing head. As aforesaid, the auxiliary overshoot control heater 38 is somewhat of an anticipator. Therefore, whenever the cycler contacts 24, 25 are closed in the Warm range, the heater 38 will be supplying additional heat to the bimetal 30, thereby causing it to move in the direction of arrow 66 more quickly to open the contacts 24, 25 and deenergize the surface unit 10. For this reason, temperatures in the Warm range are maintained for all intents and purposes at the desired temperature, i.e. no effective overshoot whatsoever. Note that the slight separation of curves 74, 75 and 86 in the Warm range is merely for purposes of clarity.

In the Boil range contact 29 remains closed and the contacts 24, 25 and 22, 23 are cycling. Note that the auxiliary overshoot control heater 38 is removed from the circuit when the contact 41 is open, i.e. the cam 42 is positioned in the Boil range by the switch knob 16 to open the switch blade 40. In this situation, there is no heat anticipation and a first cycle operation will require a longer time for the bimetal 30 to flex open from the heat of merely the single auxiliary heater 34. The extended period of continuous surface unit energization provides a maximum overshoot condition as seen by the temperature differential between curves 74 and 75 in the Boil range. This high temperature differential or overshoot will permit high volume items such as a pan of water to come quickly up to a boil.

In the Fry range, curve 74 indicates a lesser amount of overshoot, i.e. the gap between curves 74 and 75 narrows. In this Fry temperature situation the contacts 29 and 41 are closed and contacts 25 and 22 are cycling as was the case in the Warm range. Note that the overshoot condition although still in existence is minimized over that in the Boil range.

Another embodiment of this invention is seen in FIGURE 4 which depicts a more accurately operating type of switch 80. The switch 80 includes certain components similar to those used in switch 12 and identical reference numerals will be used to designate similar parts. More particularly the switch 80 will include the operating knob 16, the main line switch 28 opening and closing on a main line contact 29. Both the auxiliary heater 34 and the overshoot anticipating control heater 38 are included to provide heat for actuating a bimetal 30 which in turn moves the contact 24 to and from a fixed contact 25 in a cycling operation. However, in the embodiment of FIGURE 3 the overshoot heater 38 is controlled through a non-linear rheostat 82 which includes a three stage rate of resistance change. Such a non-linear rheostat effects a different overshoot in each of the Warm, Boil and Fry ranges, a different stage of the rheostat being used for each range. As with switch 12, the knob 16 is adapted through a shaft 17 and suitable cams or linkages to manipulate the switch blade 28, the movable rheostat arm 84 and the bimetal 30.

Referring again to the graphic representation of FIGURE 5, the curve 86 is included to indicate overshoot or temperature variations from the dry pan temperature curve 75 when using the non-linear rheostat embodiment of FIGURE 4. It should be understood that the switch 80 merely replaces the switch 12 in the circuit of FIGURE 1. Note that in the Warm range essentially no overshoot occurs on the first cycle and cooking unit temperatures are maintained substantially in line with the selected temperature (average dry pan temperature) for the food being prepared. In the Boil range the overshoot control circuit including the heater 38 is deenergized (circuit opened at rheostat 82, 84) to effect the maximum overshoot condition. This is equivalent to opening contact 41 in the FIGURE 1 arrangement. In the Fry range the rheostat arm 84 is moved to effect a variable resistance in series with the overshoot control heater 38. This accomplishes a minimum overshoot condition in the curve portion 88 and a maximum overshoot condition in the curve portion 90 in accordance with the optimum conditions for cooking operations normally accomplished in these temperature areas of the Fry range.

Although the second embodiment switch 80 shows the rheostat 82 in series with a separate heater 38, it should be understood that the use of a rheostat will permit the consolidation of heaters 34 and 38 into a single heater. In this alternative the rheostat will be positioned to effect a heat output equivalent to that of the heater 34 in the Boil range. With the control in either the Warm or Fry range, the rheostat will effect additional heat for controlling overshoot temperature in accordance with the results illustrated in curve 86.

It should therefore be seen that an improved temperature system has been provided wherein an auxiliary overshoot control circuit is selectively incorporated into the temperature sensing circuit in accordance with the particular temperatures selected. With the teachings of this invention overshoot temperatures on the first cycle may be controlled precisely with the result that cooking operations are correspondingly enhanced.

While the embodiments of the present invention as herein disclosed, constitute preferred forms, it is to be understood that other forms might be adopted.

What is claimed is as follows:

1. A control system for an electric range comprising a surface cooking unit adapted to support a cooking utensil or the like, a power supply having a pair of line conductors and a neutral line, first temperature responsive switch means associated with said cooking unit and adapted to sense the temperature of said utensil, and a temperature control switch means for said cooking unit having a control indicator for preselecting the operating temperature for said cooking unit, a second temperature responsive switch means in series electrical flow relationship to said cooking unit and said line conductors, a first heater in heat transfer relationship to said second temperature responsive switch means and in series electrical flow relationship with said cooking unit, said first temperature responsive switch means, said neutral line and one of said line conductors, and an auxiliary heater in heat transfer relationship to said second temperature responsive switch means, said auxiliary heater being placed by said control indicator selectively in series electrical flow relationship with said cooking unit and said line conductors and in parallel electrical flow relationship with said first heater, thereby to control a first cycle overshoot temperature of said cooking unit in accordance with the preselected operating temperature for said cooking unit.

2. A control system for an electric range comprising a surface cooking unit adapted to support a cooking utensil or the like, high and low voltage power supply means, first temperature responsive switch means associated with said cooking unit and adapted to sense the temperature of said utensil, and a temperature control switch means for said cooking unit having a control indicator for preselecting the operating temperature for said cooking unit, a second temperature responsive switch means in series electrical flow relationship to said cooking unit and said high voltage power supply means, a first heater in heat transfer relationship to said second temperature responsive switch means and in series electrical flow relationship with said cooking unit, said first temperature responsive switch means and said low voltage power supply means, and an auxiliary heater in heat transfer relationship to said second temperature responsive means, said auxiliary heater being placed by said control indicator selectively in series electrical flow relationship with said cooking unit and said high voltage power supply means and in parallel electrical flow relationship with said first heater, thereby to control the overshoot temperature of said cooking unit.

3. A control system for an electric stove comprising a surface cooking unit adapted to support a cooking utensil or the like, high and low voltage power supply means, first bimetal cycler switch means associated with said cooking unit and adapted to sense the temperature of said utensil, and a temperature control switch means for said cooking unit having a control indicator for preselecting operating temperatures in the warm, boil or fry range for said cooking unit, a second bimetal cycler switch means including cycling contacts in series electrical flow relationship to said cooking unit and high voltage power supply means, a first heater in heat transfer relationship to said second bimetal cycler switch means and in series electrical flow relationship with said cooking unit, said first bimetal cycler switch means and said low voltage power supply means, and an auxiliary heater in heat transfer relationship to said second bimetal cycler switch means, said auxiliary heater being mechanically switched by said control indicator into series electrical flow relationship with said cooking unit, said cycling contacts and said high voltage power supply means and in parallel electrical flow relationship with said first heater when operating temperatures are preselected in either the warm or fry range, thereby to control the overshoot temperature of said cooking unit.

4. In combination, a surface cooking unit adapted to support a utensil, power supply means for energizing said cooking unit, means for controlling said power supply in accordance with a preselected temperature for said utensil including, bimetal cycler switch means having a bimetal member through which power is supplied to said cooking unit, means for sensing the temperature of said utensil, first heating means responsive to said sensing and acting on said bimetal member in a manner for causing said switch means to deenergize said cooking unit in an interval predetermined by said preselected temperature, and second heating means selectively conditioned for energization by said temperature preselection and acting on said bimetal member in the same manner as said first heating means for altering said predetermined interval in accordance with said preselected temperature, said second heating means being connected with said bimetal member for energization concurrently with said first heating means to supplement said first heating means when power is supplied to said cooking unit through said bimetal member.

5. In combination, a surface cooking unit adapted to support a utensil, power supply means for energizing said cooking unit, means for controlling said power supply in accordance with a first or second preselected temperature for said utensil including, means in series electrical flow relationship with said cooking unit and said power supply for periodically energizing and deenergizing said cooking unit, means for sensing the temperature of said utensil, means including a first actuator responsive to said sensing means and acting on said energizing and deenergizing means in a manner for causing said energizing and deenergizing means to deenergize said cooking unit in an interval predetermined by said first or second preselected temperatures, and means including a second actuator conditioned for energization by said second temperature preselection and acting on said energizing and deenergizing means in the same manner as said first actuator for altering said predetermined interval in accordance with said second preselected temperature, said second actuator being connected with said energizing and deenergizing means for energization concurrently with said first actuator to supplement said first actuator when power is supplied to said cooking unit through said energizing and deenergizing means.

6. The combination of claim 5 wherein said second actuator is an infinitely variable heater.

7. A control system for an electric stove comprising a surface cooking unit adapted to support a cooking utensil or the like, high and low voltage power supply means, first temperature responsive switch means associated with said cooking unit and adapted to sense the temperature of said utensil, and a temperature control switch means for said cooking unit having a control indicator for preselecting operating temperatures for said cooking unit in the range below approximately 200° F., between approximately 200° F. or above approximately 250° F., a second temperature responsive means including a pair of cycling contacts in series electrical flow relationship to said cooking unit and said high voltage power supply means, a first heater means in heat transfer relationship to said second temperature responsive means and in series electrical flow relationship with said cooking unit and said first temperature responsive switch means, and an auxiliary heater means in heat transfer relationship to said second temperature responsive means, said auxiliary heater means being placed by said control indicator selectively in series electrical flow relationship with said cooking unit, said cycling contacts and said high voltage power supply means and in parallel electrical flow relationship with said first heater means when operating temperatures are preselected in the range below approximately 200° F. or above approximately 250° F., thereby to control the overshoot temperature of said cooking unit.

8. The control system of claim 7 wherein said auxiliary heater means includes a non-linear variable resistance positioned by said control indicator to vary infinitely the heat transferred to said second temperature responsive means.

9. In combination, a surface cooking unit adapted to support a utensil, power supply means for energizing said cooking unit, means for controlling said power supply in accordance with a first or second preselected temperature for said utensil including, thermally responsive switch means in the power supply to said cooking unit, means for conditioning said switch means in accordance with said first or second preselected temperature, means for sensing the temperature of said utensil, means responsive to said sensing means for causing said thermally responsive switch means to deenergize said cooking unit in an interval predetermined by said conditioning means when said conditioning means is set for said first or second preselected temperature, and means conditioned for energization by said conditioning means only when set for said second preselected temperature for altering said predetermined interval, said altering means supplementing the means responsive to said sensing means to assist concurrently therewith in causing said thermally responsive switch means to deenergize said cooking unit.

10. In combination, a surface cooking unit adapted to support a utensil, power supply means for energizing said cooking unit, means for controlling said power supply in accordance with a preselected range of warm, boil or fry temperatures for said utensil including, thermally responsive switch means in the power supply to said cooking unit, means for sensing the temperature of said utensil, means responsive to said sensing means for heating said switch means a first amount to deenergize said cooking unit in an interval predetermined by each preselected temperature range, and means selectively conditioned for energization by a temperature preselection in the warm or fry range only to assist said means responsive to said sensing means by heating said switch means a second amount concurrently with the heating of said means responsive to said sensing means to supplement said first amount for reducing said predetermined interval.

References Cited in the file of this patent
UNITED STATES PATENTS

| | | |
|---|---|---|
| 2,815,428 | Pearce | Dec. 3, 1957 |
| 2,816,203 | Weeks | Dec. 10, 1957 |
| 2,819,371 | Aldrich et al. | Jan. 7, 1958 |
| 2,838,645 | Welch | June 10, 1958 |
| 2,919,337 | Brosseau et al. | Dec. 29, 1959 |
| 2,926,233 | Holtkamp | Feb. 23, 1960 |
| 2,999,144 | Carissimi | Sept. 5, 1961 |